US012752222B2

(12) United States Patent
Strasser et al.

(10) Patent No.: US 12,752,222 B2
(45) Date of Patent: Oct. 6, 2026

(54) CANDLE FILTER DEVICE

(71) Applicant: LENZING AKTIENGESELLSCHAFT, Lenzing (AT)

(72) Inventors: Stefan Strasser, Strass im Attergau (AT); Jürgen Wögerer, Seewalchen am Attersee (AT); Georg Eisl, Thalgau (AT); Dominik Ahamer, Seewalchen am Attersee (AT)

(73) Assignee: LENZING AKTIENGESELLSCHAFT, Lenzing (AT)

(*) Notice: Subject to any disclaimer, the term of this patent is extended or adjusted under 35 U.S.C. 154(b) by 654 days.

(21) Appl. No.: 18/096,880

(22) Filed: Jan. 13, 2023

(65) Prior Publication Data

US 2023/0226470 A1 Jul. 20, 2023

Related U.S. Application Data

(60) Provisional application No. 63/299,646, filed on Jan. 14, 2022.

(51) Int. Cl.

*B01D 29/68* (2006.01)
*B01D 29/15* (2006.01)
*B01D 29/52* (2006.01)
*B01D 29/66* (2006.01)

(52) U.S. Cl.

CPC ............. *B01D 29/68* (2013.01); *B01D 29/15* (2013.01); *B01D 29/52* (2013.01); *B01D 29/661* (2013.01); *B01D 2201/0415* (2013.01); *B01D 2201/0446* (2013.01); *B01D 2201/084* (2013.01); *B01D 2201/202* (2013.01)

(58) Field of Classification Search

None

See application file for complete search history.

(56) References Cited

U.S. PATENT DOCUMENTS

| | | | | | |
|---|---|---|---|---|---|
| 171,056 | A * | 12/1875 | Sinclaire | B01D 35/18 | 351/63 |
| 385,333 | A * | 6/1888 | Way | B01D 29/15 | 210/454 |
| 582,404 | A * | 5/1897 | Stifel | B01D 24/02 | 210/110 |
| 654,592 | A * | 7/1900 | Barr | B01D 29/15 | 210/411 |
| 1,203,835 | A * | 11/1916 | Zahm | C02F 1/003 | 210/85 |
| 1,632,960 | A * | 6/1927 | Giese | B01D 29/52 | 210/454 |
| 1,696,735 | A * | 12/1928 | Scoville | B01D 29/39 | 210/418 |

(Continued)

FOREIGN PATENT DOCUMENTS

| | | | | |
|---|---|---|---|---|
| DE | 66 10 766 U | | 3/1976 | |
| DE | 3249756 C2 | * | 3/1987 | B01D 29/15 |

(Continued)

*Primary Examiner* — Robert J Popovics
(74) *Attorney, Agent, or Firm* — Venable LLP

(57) ABSTRACT

The invention relates to a candle filter device, primarily for filtration of solids from liquids, and containing one or more candle filter elements and the process of operating the same.

19 Claims, 5 Drawing Sheets

(56) References Cited

U.S. PATENT DOCUMENTS 1,706,400 A * 3/1929 Diamond .............. B01D 29/11 210/323.2
1,738,114 A * 12/1929 Olson .................... B01D 29/27 210/486
1,771,928 A * 7/1930 Jung ...................... B01D 29/92 210/220
1,922,315 A * 8/1933 Mooz ..................... B01D 29/46 210/488
1,992,101 A * 2/1935 Stuart .................... B01D 29/46 210/488
2,057,814 A * 10/1936 Barrett ................... B01D 29/19 210/457
2,083,578 A * 6/1937 Roberts ................ C10G 73/025 210/772
2,230,174 A * 1/1941 Beale ..................... B01D 29/92 210/318
2,301,430 A * 11/1942 Malanowski .......... B01D 29/52 210/497.1
2,374,976 A * 5/1945 Bauer .................... B01D 29/52 210/345
2,423,172 A * 7/1947 Booth .................... B01D 29/33 210/411
2,468,603 A * 4/1949 Pew ..................... B01D 29/114 210/323.2
2,475,561 A * 7/1949 Cooperider ............ B01D 33/21 210/324
2,487,769 A * 11/1949 Ebert ..................... B01D 29/52 210/411
2,523,793 A * 9/1950 Vance ................ B01D 17/0202 210/DIG. 5
2,562,699 A * 7/1951 Cooperson ............. B01D 37/02 210/411
2,570,132 A * 10/1951 Koupal ................ B01D 29/114 210/323.1
2,578,636 A * 12/1951 Smith .................... B01D 29/72 210/791
2,600,458 A * 6/1952 Ackley ................ B01D 29/114 210/135
2,605,903 A * 8/1952 Schuller ................. B01D 35/00 210/399
2,620,892 A * 12/1952 Stover .................... B01D 53/26 210/DIG. 6
2,693,882 A * 11/1954 Ebert ..................... B01D 29/52 210/345
2,710,099 A * 6/1955 Kalinske ................ B01D 29/48 210/323.2
2,731,107 A * 1/1956 Hersey, Jr. ............. B01D 29/15 55/284
2,742,158 A * 4/1956 Schuller ................. B01D 29/52 210/345
2,744,632 A * 5/1956 Gardes ................... B01D 29/54 210/323.2
2,754,005 A * 7/1956 Tursky ................... B01D 29/48 210/450
2,757,799 A * 8/1956 Ritchie .................. B01D 37/00 210/345
2,772,786 A * 12/1956 Gardes ................... B01D 29/15 210/441
2,780,363 A * 2/1957 Pew ....................... B01D 29/66 210/411
2,784,846 A * 3/1957 Ebert ..................... B01D 29/52 210/456
2,819,800 A * 1/1958 Goodloe ................ B01D 25/00 210/488
2,834,473 A * 5/1958 Battey ................... B01D 29/66 210/333.01
2,848,112 A * 8/1958 Hass ...................... B01D 29/66 210/333.01
2,854,142 A * 9/1958 Baker .................... B01D 29/15 210/342
2,862,622 A * 12/1958 Jones ..................... B01D 29/66 210/411
2,872,044 A * 2/1959 Kasten .................. B01D 25/00 210/488
2,887,228 A * 5/1959 Harlan ................. B01D 35/027 210/411
2,889,933 A * 6/1959 Brundage ............. B01D 29/52 210/323.2
2,914,179 A * 11/1959 Foust ..................... B01D 29/52 210/493.1
2,954,873 A * 10/1960 Davis ..................... B01D 29/52 210/411
2,981,416 A * 4/1961 Lawlor ................. B01D 29/15 210/411
3,034,652 A * 5/1962 Hobson, Jr. ............ B01D 29/52 210/232
3,042,214 A * 7/1962 Arvanitakis ........... B01D 35/16 210/330
3,055,290 A * 9/1962 Arvanitakis ....... B01D 33/0183 210/407
3,100,190 A * 8/1963 Hobson, Jr. ............ B01D 29/52 210/497.1
3,149,072 A * 9/1964 Silverman ............. B01D 29/66 210/488
3,155,613 A * 11/1964 Felix ...................... B01D 35/20 210/232
3,169,109 A * 2/1965 Hirs ....................... B01D 35/12 210/138
3,170,873 A * 2/1965 May ..................... B01D 17/045 210/323.2
3,225,933 A * 12/1965 Roll ....................... B01D 29/15 40/518
3,244,286 A * 4/1966 Borre ..................... B01D 29/52 210/411
3,251,473 A * 5/1966 Fuhring ................ D06F 43/085 210/167.31
3,262,568 A * 7/1966 Zehrbach ............ B01D 29/114 210/138
3,279,608 A * 10/1966 Levendusky .......... B01D 29/52 210/232
3,280,978 A * 10/1966 Scott .................... B01D 29/885 210/408
3,291,310 A * 12/1966 Marvel .................. B01D 29/21 210/167.13
3,310,175 A * 3/1967 Mclagan ................ B01D 37/02 55/296
3,312,352 A * 4/1967 Shiells ................. B01D 29/114 210/323.2
3,319,793 A * 5/1967 Miller, Jr. ............ B01D 29/902 210/243
3,356,215 A * 12/1967 Miles, Jr. ............... B01D 37/04 210/333.1
3,365,065 A * 1/1968 Varjabedian ........... B01D 29/52 55/341.1
3,394,532 A * 7/1968 Octiker ................. F16K 31/385 55/467
3,394,815 A * 7/1968 Harms ................... B01D 29/52 210/457
3,402,818 A * 9/1968 Sasaki .................... B01D 35/00 210/411
3,405,807 A * 10/1968 Burkhardt .............. B01D 29/96 210/232
3,407,572 A * 10/1968 Tolley .................... B01D 46/76 55/299
3,414,129 A * 12/1968 Going .................. B01D 29/606 210/411
3,416,669 A * 12/1968 Hubbard .............. B01D 29/668 210/411
3,422,958 A * 1/1969 Newman ................ B01D 35/16 210/457
3,438,502 A * 4/1969 Borre ..................... B01D 29/19 210/232
3,447,690 A * 6/1969 Kracklauer ........ B01D 29/6484 55/299
3,482,700 A * 12/1969 Bebech .................. B01D 29/72 210/407
3,503,516 A * 3/1970 Harms ................... B01D 29/52 210/457

(56) References Cited

U.S. PATENT DOCUMENTS

| | | | | | | |
|---|---|---|---|---|---|---|
| 3,530,989 | A | * | 9/1970 | Koethke | B01D 29/52 | 210/411 |
| 3,540,190 | A | * | 11/1970 | Brink, Jr. | B01D 46/24 | 55/423 |
| 3,556,304 | A | * | 1/1971 | Collard | B01D 37/02 | 210/489 |
| 3,568,845 | A | * | 3/1971 | Llamas | B01D 29/46 | 210/488 |
| 3,623,910 | A | * | 11/1971 | Calhoun et al. | B01D 46/70 | 96/228 |
| 3,633,753 | A | * | 1/1972 | Petitjean | B01D 29/66 | 55/288 |
| 3,637,079 | A | * | 1/1972 | Strub | B01D 29/94 | 210/794 |
| 3,642,141 | A | * | 2/1972 | Hobson, Jr. | B01D 29/15 | 210/457 |
| 3,666,097 | A | * | 5/1972 | Ryan | B01D 29/661 | 210/333.01 |
| 3,696,933 | A | * | 10/1972 | Pall | B01D 29/232 | 210/444 |
| 3,715,033 | A | * | 2/1973 | Soriente | B01D 29/15 | 210/338 |
| 3,731,803 | A | * | 5/1973 | Hirs | B01D 24/10 | 210/279 |
| 3,736,641 | A | * | 6/1973 | Fosdick | B21C 37/124 | 29/896.62 |
| 3,744,633 | A | * | 7/1973 | Schmidt, Jr. | B01D 29/94 | 210/785 |
| 3,750,889 | A | * | 8/1973 | Acosta | B01D 29/52 | 210/499 |
| 3,765,152 | A | * | 10/1973 | Pausch | B01D 46/4281 | 95/279 |
| 3,780,868 | A | * | 12/1973 | Miles | B01D 29/54 | 210/333.1 |
| 3,796,316 | A | * | 3/1974 | Matz | B01D 29/52 | 100/116 |
| 3,891,551 | A | * | 6/1975 | Tiedemann | B01D 29/661 | 210/323.1 |
| 4,051,033 | A | * | 9/1977 | Blace | B01D 29/23 | 210/483 |
| 4,064,049 | A | * | 12/1977 | Calvano | B01D 29/925 | 210/441 |
| 4,069,292 | A | | 1/1978 | Herrington et al. | | |
| 4,089,664 | A | * | 5/1978 | Noland | B01D 46/02 | 55/374 |
| 4,089,781 | A | * | 5/1978 | Asp | B01D 29/52 | 210/411 |
| 4,094,784 | A | * | 6/1978 | Hirano | B01D 33/52 | 210/780 |
| 4,141,128 | A | * | 2/1979 | Wonderling | B23P 15/00 | 55/379 |
| 4,153,552 | A | * | 5/1979 | Muther | B01D 29/66 | 210/427 |
| 4,157,900 | A | * | 6/1979 | Margraf | B01D 46/0005 | 55/379 |
| 4,163,724 | A | * | 8/1979 | Muller | B01D 29/114 | 210/334 |
| 4,176,066 | A | * | 11/1979 | Sloan | B01D 29/44 | 210/241 |
| 4,201,674 | A | * | 5/1980 | Schwinghammer | B01D 29/114 | 210/411 |
| 4,210,537 | A | * | 7/1980 | Butterworth | B01D 29/52 | 210/323.2 |
| 4,213,861 | A | * | 7/1980 | Muller | B01D 29/114 | 210/797 |
| 4,217,700 | A | * | 8/1980 | Muller | B01D 29/114 | 210/771 |
| 4,243,533 | A | * | 1/1981 | Savolainen | B01D 29/54 | 210/309 |
| 4,246,114 | A | * | 1/1981 | Krebs | C02F 3/1242 | 210/220 |
| 4,259,095 | A | * | 3/1981 | Johnson, Jr. | B01D 46/48 | 55/379 |
| 4,264,345 | A | * | 4/1981 | Miller | B01D 50/20 | 55/504 |
| 4,264,445 | A | * | 4/1981 | Lumikko | B01D 29/66 | 210/323.2 |
| 4,265,771 | A | * | 5/1981 | Lennartz | B01D 29/72 | 210/791 |
| 4,272,263 | A | * | 6/1981 | Hancock | B01D 46/4281 | 55/377 |
| 4,277,349 | A | * | 7/1981 | Schwinghammer | B01D 29/114 | 134/113 |
| 4,289,630 | A | * | 9/1981 | Schmidt, Jr. | B01D 29/843 | 55/300 |
| 4,290,790 | A | * | 9/1981 | Okubo | B01D 46/06 | 55/379 |
| 4,292,180 | A | * | 9/1981 | Zylka | B01D 29/15 | 210/497.01 |
| 4,293,414 | A | * | 10/1981 | Gianneli | B01D 37/02 | 210/323.2 |
| 4,297,115 | A | * | 10/1981 | Johnson, Jr. | B01D 46/06 | 55/379 |
| 4,317,732 | A | * | 3/1982 | Shoquist | B01D 37/04 | 210/791 |
| 4,324,571 | A | * | 4/1982 | Johnson, Jr. | B01D 46/0041 | 55/379 |
| 4,344,781 | A | * | 8/1982 | Higgins | B01D 46/026 | 55/379 |
| 4,388,197 | A | * | 6/1983 | Lumikko | B01D 29/66 | 162/189 |
| 4,405,466 | A | * | 9/1983 | Giannelli | B01D 29/114 | 210/411 |
| 4,419,234 | A | * | 12/1983 | Miller | B01D 29/15 | 210/232 |
| 4,433,986 | A | * | 2/1984 | Borst | B01D 46/04 | 96/428 |
| 4,436,633 | A | * | 3/1984 | Robinsky | B01D 29/44 | 210/791 |
| 4,439,327 | A | * | 3/1984 | Muller | B01D 29/114 | 210/791 |
| 4,443,346 | A | * | 4/1984 | Muller | B01D 29/668 | 210/791 |
| 4,446,030 | A | * | 5/1984 | Schmidt, Jr. | B01D 29/52 | 210/120 |
| 4,473,472 | A | * | 9/1984 | Muller | B01D 29/92 | 210/458 |
| 4,488,965 | A | * | 12/1984 | Muller | B01D 29/15 | 55/374 |
| 4,511,471 | A | * | 4/1985 | Muller | B01D 29/114 | 210/333.1 |
| 4,517,086 | A | * | 5/1985 | Romey | B01D 29/72 | 210/334 |
| 4,522,717 | A | * | 6/1985 | Brust | B01D 46/4227 | 210/450 |
| 4,525,274 | A | * | 6/1985 | Willus | B01D 35/30 | 210/333.1 |
| 4,525,275 | A | * | 6/1985 | Ostlund | B01D 29/52 | 210/334 |
| 4,526,688 | A | * | 7/1985 | Schmidt, Jr. | B01D 29/15 | 210/489 |
| 4,526,689 | A | * | 7/1985 | Morgan | B01D 29/117 | 210/345 |
| 4,528,103 | A | * | 7/1985 | Spilkin | B01D 29/52 | 210/779 |
| 4,540,490 | A | * | 9/1985 | Shibata | B01D 65/02 | 976/DIG. 380 |
| 4,547,296 | A | * | 10/1985 | Sim | B01D 29/114 | 210/323.2 |
| 4,552,669 | A | * | 11/1985 | Sekellick | B01D 29/35 | 210/323.2 |
| 4,560,483 | A | * | 12/1985 | Warning | B01D 29/668 | 210/489 |
| 4,578,197 | A | * | 3/1986 | Muller | B01D 29/605 | 210/333.1 |

(56) References Cited

U.S. PATENT DOCUMENTS 4,584,003 A * 4/1986 Oda .................. B01D 46/0042 55/341.2
4,591,446 A * 5/1986 Muller .................. B01D 29/52 261/76
4,592,847 A * 6/1986 Schumacher .......... B01D 29/80 210/186
4,600,415 A * 7/1986 Barton .................. B01D 46/04 55/303
4,604,201 A * 8/1986 Muller .................. B01D 29/15 210/323.2
4,609,462 A * 9/1986 Flynn .................. B01D 29/52 210/232
4,622,137 A * 11/1986 Kessler .................. B01D 29/15 210/167.13
4,650,580 A * 3/1987 Schumacher .......... B01D 29/111 427/244
4,652,369 A * 3/1987 DePolo .................. B01D 29/21 210/356
4,657,673 A * 4/1987 Kessler .................. B01D 24/14 210/167.13
4,680,038 A * 7/1987 Titus .................. B01D 29/908 55/380
4,704,210 A * 11/1987 Boze .................. B01D 35/12 210/497.1
4,713,174 A * 12/1987 Zievers .............. B01D 46/0005 55/379
4,725,356 A * 2/1988 Zievers .................. B01D 29/52 210/450
4,728,423 A * 3/1988 Kuwajima ........... B01D 29/114 210/438
4,735,638 A * 4/1988 Ciliberti .................. F16F 1/022 55/498
4,741,841 A * 5/1988 Borre .................. B01D 33/722 55/304
RE32,695 E * 6/1988 Nahra .................. A23B 2/42 261/129
4,775,471 A * 10/1988 Nagai .................. B01D 63/043 376/313
4,789,474 A * 12/1988 Gaudfrin ................ B01D 29/60 210/411
4,804,481 A * 2/1989 Lennartz ................ B01D 29/52 210/791
4,830,747 A * 5/1989 Kubota .................. B01D 29/66 134/22.12
4,836,922 A * 6/1989 Rishel ................ B01D 33/0315 210/232
4,861,498 A * 8/1989 Robinsky ............. B01D 29/663 210/791
4,865,627 A * 9/1989 Dewitz .................. B01D 46/46 95/286
4,872,981 A * 10/1989 Hobson, Jr. ............ B01D 29/90 210/420
4,876,006 A * 10/1989 Ohkubo ................. B01D 65/02 210/321.89
4,919,801 A * 4/1990 Hobson, Jr. .......... B01D 35/153 210/388
4,943,379 A * 7/1990 Boze .................. B01D 37/02 210/411
4,944,887 A * 7/1990 Frederick ............... B01D 29/70 210/791
4,952,317 A * 8/1990 Culkin .................. B01D 63/16 210/636
4,957,625 A * 9/1990 Katoh .................. B01D 29/52 210/123
4,963,271 A * 10/1990 Raehse ................ B01D 29/114 210/772
4,968,424 A * 11/1990 Plaisier .................. B01D 29/15 55/529
4,997,561 A * 3/1991 Schutz .................. B01D 29/11 210/232
5,017,241 A * 5/1991 Ryan .................. B01D 29/661 210/791
5,028,323 A * 7/1991 Gould .................. B01D 29/52 210/450
5,057,217 A 10/1991 Lutz et al.
5,062,965 A * 11/1991 Bernou .................. B01D 29/72 210/785
5,062,968 A * 11/1991 Warning ............. B01D 29/668 210/93
5,084,176 A * 1/1992 Davis ................ B01D 33/0315 209/381
5,085,997 A * 2/1992 Muller .................. C12H 1/063 210/791
5,114,596 A * 5/1992 Laterra ................ B01D 29/661 134/22.12
5,116,395 A * 5/1992 Williams ............... B01D 46/04 96/426
5,128,038 A * 7/1992 Slavitschek .......... B01D 29/114 376/313
5,143,530 A * 9/1992 Haldipur ............ B01D 46/2407 55/378
5,152,815 A * 10/1992 Zievers .................. B01D 46/58 55/374
5,173,098 A * 12/1992 Pipkorn ................. B01D 46/06 55/379
5,209,844 A * 5/1993 Zievers ................ B01D 29/114 210/411
5,223,012 A * 6/1993 Best .................. B01D 29/54 55/381
5,223,138 A * 6/1993 Zievers .................. B28B 1/265 162/152
5,227,076 A * 7/1993 Bogen ................ B01D 21/0012 210/791
5,230,131 A * 7/1993 Hobson, Jr. ............ B01D 29/96 29/402.06
5,279,733 A * 1/1994 Heymans ............... B01D 29/96 210/485
5,296,010 A * 3/1994 Clark ................ B01D 46/4227 55/DIG. 30
5,296,134 A * 3/1994 Zaiter .................. B01D 29/66 55/482
5,358,552 A * 10/1994 Seibert .................. B01D 46/79 95/281
5,384,034 A * 1/1995 Hetzel .................. B01D 29/52 210/418
5,401,406 A * 3/1995 Johnson ............. B01D 46/2407 210/450
5,407,570 A * 4/1995 Hobson, Jr. ............ B01D 29/15 210/232
5,417,101 A * 5/1995 Weich .................. B01D 29/114 73/40
5,421,845 A * 6/1995 Gregg .................. B01D 46/04 55/294
5,435,911 A * 7/1995 Hohle .................. B01D 29/66 210/438
5,437,788 A * 8/1995 Geibel ................. B01D 29/661 210/411
5,441,633 A * 8/1995 Schewitz ............. B01D 29/908 210/323.2
5,445,738 A * 8/1995 Fry .................. B01D 33/0315 210/384
5,474,586 A * 12/1995 Eaton .................. B01D 29/33 55/378
5,494,591 A * 2/1996 Stamm ................. B01D 29/114 210/791
5,498,349 A * 3/1996 Kurahashi ............ B01D 29/606 210/411
5,518,609 A * 5/1996 Karlsson .............. B01D 29/605 210/97
5,525,221 A * 6/1996 Hohle .................. B01D 29/15 210/323.2
5,628,916 A * 5/1997 Stevens .................. B01D 29/52 210/799
5,639,369 A * 6/1997 Bowlsbey .............. B01D 29/15 210/497.2
5,667,679 A * 9/1997 Bozenmayer .......... B01D 29/52 210/232

(56) References Cited

U.S. PATENT DOCUMENTS

| | | | | | |
|---|---|---|---|---|---|
| 5,681,465 | A * | 10/1997 | Takenoya | B01D 29/03 | 210/407 |
| 5,693,362 | A * | 12/1997 | Boos | B01J 8/006 | 118/712 |
| 5,766,467 | A * | 6/1998 | Rech | B01D 29/15 | 55/508 |
| 5,766,486 | A * | 6/1998 | Cathcart | B01D 46/70 | 210/791 |
| 5,770,066 | A * | 6/1998 | Coates | B01D 29/668 | 210/450 |
| 5,780,126 | A * | 7/1998 | Smith | B01D 46/2407 | 428/116 |
| 5,785,870 | A * | 7/1998 | Davis | B01D 29/48 | 210/488 |
| 5,792,353 | A * | 8/1998 | Jungi | B01D 29/48 | 210/357 |
| 5,795,359 | A * | 8/1998 | McLeish | B01D 46/70 | 96/233 |
| 5,849,375 | A * | 12/1998 | Smith | B01D 39/2086 | 428/34.5 |
| 5,855,799 | A * | 1/1999 | Herrmann | B01D 29/52 | 210/791 |
| 5,858,217 | A * | 1/1999 | Redl | B01D 29/52 | 210/414 |
| 5,876,471 | A * | 3/1999 | Lippert | B01D 46/58 | 55/508 |
| 5,944,990 | A * | 8/1999 | Edens | B01D 29/96 | 210/450 |
| 5,945,006 | A * | 8/1999 | Mignani | B01D 29/114 | 210/411 |
| 5,948,257 | A * | 9/1999 | Custer | B01D 46/2407 | 210/508 |
| 5,972,228 | A * | 10/1999 | Ingelman | B01D 35/16 | 210/333.1 |
| 6,004,465 | A * | 12/1999 | Uhr | B01D 29/33 | 210/651 |
| 6,007,718 | A * | 12/1999 | Booth | B01D 29/15 | 210/453 |
| 6,041,944 | A * | 3/2000 | Meier | B01D 29/925 | 210/489 |
| 6,051,138 | A * | 4/2000 | Hobson, Jr. | B01D 29/72 | 55/379 |
| 6,056,796 | A * | 5/2000 | Chiang | B01D 46/2407 | 55/482 |
| 6,077,333 | A * | 6/2000 | Wolfs | B03C 1/288 | 210/695 |
| 6,102,212 | A * | 8/2000 | Strid | B01D 29/15 | 210/488 |
| 6,123,746 | A * | 9/2000 | Alvin | B01D 46/2407 | 277/633 |
| 6,177,006 | B1 * | 1/2001 | Nagaoka | C02F 1/004 | 210/330 |
| 6,200,367 | B1 * | 3/2001 | Phillips | B01D 46/0086 | 96/417 |
| 6,217,781 | B1 * | 4/2001 | Hobson, Jr. | B01D 29/52 | 210/791 |
| 6,254,774 | B1 * | 7/2001 | Henderson | B01D 29/96 | 376/313 |
| 6,309,552 | B1 * | 10/2001 | Hobson, Jr. | B01D 29/52 | 210/791 |
| 6,341,567 | B1 * | 1/2002 | Robertson | B01D 46/4263 | 55/482.1 |
| 6,342,158 | B1 * | 1/2002 | Wills | B01D 29/15 | 210/240 |
| 6,365,054 | B1 * | 4/2002 | Kruger | B01D 29/52 | 210/411 |
| 6,372,133 | B1 * | 4/2002 | von der Hardt | B01D 29/52 | 210/232 |
| 6,387,271 | B1 * | 5/2002 | Geibel | B01D 39/1692 | 210/500.36 |
| 6,398,837 | B1 * | 6/2002 | Alvin | B01D 39/2075 | 55/486 |
| 6,401,938 | B1 * | 6/2002 | Schewitz | B01D 29/52 | 210/489 |
| 6,413,422 | B1 * | 7/2002 | Schumacher | B01D 29/114 | 210/232 |
| 6,419,842 | B1 * | 7/2002 | Kupka | F26B 7/00 | 210/330 |
| 6,428,593 | B1 * | 8/2002 | Bruck | B01D 46/0002 | 55/482 |
| 6,439,273 | B1 * | 8/2002 | Kruger | B01D 29/114 | 141/69 |
| 6,468,322 | B1 * | 10/2002 | Alvin | B01D 46/62 | 55/482 |
| 6,475,378 | B1 * | 11/2002 | Shi | B01D 35/30 | 210/90 |
| 6,488,842 | B2 * | 12/2002 | Nagaoka | B01D 29/58 | 210/411 |
| 6,495,037 | B1 * | 12/2002 | Schuyler | B01D 29/114 | 210/232 |
| 6,537,449 | B2 * | 3/2003 | Schewitz | B01D 29/52 | 210/323.1 |
| 6,576,146 | B2 * | 6/2003 | Fry | B01D 29/33 | 210/791 |
| 6,605,139 | B2 * | 8/2003 | Felix | B01D 46/02 | 96/427 |
| 6,652,615 | B2 * | 11/2003 | Quick | B01D 29/111 | 55/501 |
| 6,676,722 | B1 * | 1/2004 | Clements | B01D 46/2407 | 55/378 |
| 6,709,586 | B2 * | 3/2004 | Mason | B01D 29/96 | 210/411 |
| 6,860,394 | B1 * | 3/2005 | Mueller | B01D 29/66 | 210/489 |
| 6,872,310 | B2 * | 3/2005 | Trotzki | B01D 29/52 | 210/345 |
| 6,981,516 | B1 * | 1/2006 | VanOsdol | F16K 15/04 | 137/550 |
| 7,063,790 | B2 * | 6/2006 | Hahn | B01D 29/48 | 210/497.1 |
| 7,077,968 | B2 * | 7/2006 | Pfeiffer | B01D 36/04 | 210/803 |
| 7,381,323 | B2 * | 6/2008 | Umezawa | B01D 29/114 | 210/791 |
| 7,487,875 | B2 * | 2/2009 | Zimmerman | B01D 29/15 | 210/345 |
| 7,754,074 | B2 * | 7/2010 | Fujie | C02F 1/444 | 210/411 |
| 7,812,206 | B2 * | 10/2010 | Wilsak | B01D 29/114 | 585/812 |
| 7,981,293 | B2 * | 7/2011 | Powell | B01D 61/18 | 210/534 |
| 7,998,353 | B2 * | 8/2011 | Vandendijk | B01D 29/15 | 210/232 |
| 8,021,467 | B2 * | 9/2011 | Zimmer | B01D 46/58 | 55/284 |
| 8,029,680 | B2 * | 10/2011 | Shinoda | B01D 29/48 | 210/777 |
| 8,192,617 | B2 * | 6/2012 | Powell | C02F 9/00 | 210/197 |
| 8,211,319 | B2 * | 7/2012 | Wilsak | B01D 29/114 | 585/812 |
| 8,221,618 | B2 * | 7/2012 | Murray | B01D 29/72 | 210/411 |
| 8,303,682 | B2 * | 11/2012 | Nowak | B01D 46/06 | 95/1 |
| 8,303,688 | B2 * | 11/2012 | Sharma | B01D 46/2407 | 210/167.04 |
| 8,309,711 | B2 * | 11/2012 | Wiley | B01D 29/94 | 210/411 |
| 8,465,654 | B2 * | 6/2013 | Leonard | B01D 29/15 | 210/232 |
| 8,591,745 | B2 * | 11/2013 | Merino | B01D 61/18 | 210/741 |
| 8,628,668 | B2 * | 1/2014 | Simonson | B03C 1/286 | 210/695 |
| 8,764,975 | B2 * | 7/2014 | Salmisuo | A61L 11/00 | 422/26 |

(56) References Cited

U.S. PATENT DOCUMENTS 8,795,521 B1 * 8/2014 McBride ............ B01D 24/4631 210/189
8,795,528 B2 * 8/2014 Knox-Holmes ..... B01D 29/668 210/330
8,888,881 B2 * 11/2014 Appelo .................. B01D 46/02 55/374
8,962,906 B2 * 2/2015 Wilsak ................... B01D 29/52 585/812
9,108,872 B2 * 8/2015 Salmisuo .................. B09B 3/45
9,192,880 B2 * 11/2015 Mickan .................. B01D 29/52
9,221,003 B2 * 12/2015 Schumann ............. B01D 46/06
9,707,498 B2 * 7/2017 Hampton ............... B01D 29/50
9,770,685 B2 * 9/2017 Krueger ................. B01D 46/71
9,782,703 B2 * 10/2017 Wittmer ................. B01D 29/52
9,782,704 B2 * 10/2017 Merino ................... C02F 1/444
10,046,253 B2 * 8/2018 Takahashi .............. B01D 29/23
10,058,802 B2 * 8/2018 Castaneda .............. B01D 29/52
10,300,411 B2 * 5/2019 Hampton ............. B01D 29/114
10,391,428 B2 * 8/2019 Holopainen ........... B01D 29/94
10,406,458 B1 * 9/2019 Nehlen, III ............ B01D 29/52
10,427,076 B2 * 10/2019 Swindell ................ B01D 29/21
10,486,090 B2 * 11/2019 Menneking .......... B01D 63/065
10,596,497 B2 * 3/2020 Backman ............. B01D 33/466
10,780,378 B2 * 9/2020 Strasser ................. B01D 29/68
10,814,255 B1 * 10/2020 Nehlen, III ............ B01D 29/90
10,814,256 B1 * 10/2020 Nehlen, III ............ B01D 29/15
10,850,216 B1 * 12/2020 Nehlen, III ............ B01D 29/52
10,918,980 B2 * 2/2021 Takahashi ............ B01D 29/668
10,946,315 B2 * 3/2021 Hensel ................. B01D 29/085
10,981,091 B1 * 4/2021 Nehlen, III ............ B01D 29/15
11,033,914 B2 * 6/2021 Ackerman ................. B01J 2/02
11,065,566 B2 * 7/2021 Nehlen, III .......... B01D 29/906
11,167,226 B2 * 11/2021 Nehlen, III ............ B01D 37/02
11,229,865 B2 * 1/2022 Decker .............. B01D 46/0001
11,364,457 B2 * 6/2022 Baniassadi ............. B01D 29/13
11,446,594 B2 * 9/2022 Wetter ............... B01D 46/0015
11,471,798 B2 * 10/2022 Vallejo .................... C02F 1/006
11,484,819 B2 * 11/2022 Wnuk .................... B01D 29/52
11,559,757 B2 * 1/2023 Ruzicka ................. B01D 35/30
11,673,079 B2 * 6/2023 Nehlen, III ............ B01D 29/17 210/323.2
11,679,347 B2 * 6/2023 McFarlen .............. B01D 29/15 210/455
11,691,094 B2 * 7/2023 Moser ..................... B29B 13/10 210/445
11,717,775 B2 * 8/2023 Maiworm ................ A23D 9/04 210/323.1
11,801,463 B2 * 10/2023 Wnuk .................. B01D 29/668
11,958,002 B2 * 4/2024 Kim ....................... B01D 29/15
12,005,387 B2 * 6/2024 Graham ................. B01D 46/02
12,030,010 B2 * 7/2024 Heidenreich ...... B01D 46/2407
12,083,453 B2 * 9/2024 Powell ................... B01D 29/52
12,103,863 B2 * 10/2024 Chen ....................... C02F 1/283
12,168,190 B2 * 12/2024 Stuiver .................. B01D 29/15
12,215,555 B2 * 2/2025 John .................... B01D 37/046
12,239,925 B2 * 3/2025 Moser ................... B29C 48/265
12,246,328 B2 * 3/2025 Simonson ............... B03C 1/023
12,311,292 B2 * 5/2025 Song ...................... B01D 29/15
12,330,093 B2 * 6/2025 Nehlen, III ............ B01D 29/90
12,330,094 B2 * 6/2025 Nehlen, III ............ B01D 29/17
12,330,959 B2 * 6/2025 Hawksley ............... C02F 1/004
12,343,662 B2 * 7/2025 Shaw ..................... B01D 29/33
12,502,633 B2 * 12/2025 Schumacher .......... B01D 29/39
12,528,034 B2 * 1/2026 Nehlen, III ............ B01D 29/52
2002/0000405 A1 * 1/2002 Diemer .................. B01D 29/19 210/323.2
2002/0006769 A1 * 1/2002 Tsuihiji ................... C02F 1/444 451/87
2002/0011440 A1 * 1/2002 Quick ................... B01D 29/111 210/493.2
2002/0038783 A1 * 4/2002 Trotzki ................ B01D 29/114 210/407
2002/0104297 A1 * 8/2002 Pipkorn ................. B01D 46/02 55/379
2002/0158002 A1 * 10/2002 Trotzki ................ B01D 29/114 210/384
2003/0066795 A1 * 4/2003 Fry ........................ B01D 29/33 210/411
2003/0164342 A1 * 9/2003 Mason ................. B01D 29/114 210/323.2
2004/0094038 A1 * 5/2004 Hahn ..................... B01D 29/48 99/277
2004/0134170 A1 * 7/2004 Pipkorn ............. B01D 46/0093 55/379
2004/0206691 A1 * 10/2004 Charin ................... B01D 29/21 210/493.1
2004/0262209 A1 * 12/2004 Umezawa ............. B01D 29/66 210/216
2005/0034436 A1 * 2/2005 Pipkorn ................. B01D 46/06 55/379
2005/0056599 A1 * 3/2005 Wilsak ................. B01D 29/114 210/767
2006/0266685 A1 * 11/2006 Umezawa ............. B01D 37/02 210/216
2006/0266686 A1 * 11/2006 Umezawa ............. B01D 37/02 210/216
2006/0266687 A1 * 11/2006 Umezawa ............ B01D 63/089 210/791
2007/0031304 A1 * 2/2007 Heidenreich ...... B01D 46/2407 422/177
2007/0039290 A1 * 2/2007 Lee ........................ B01D 46/02 55/302
2007/0045173 A1 * 3/2007 Zimmerman .......... B01D 29/15 210/450
2007/0225539 A1 * 9/2007 Wilsak ..................... B01D 9/00 585/812
2007/0251876 A1 * 11/2007 Krogue ............. B01D 39/2062 210/497.1
2008/0149557 A1 * 6/2008 Reynders ............... B01D 29/15 210/323.2
2008/0237152 A1 * 10/2008 Benachenhou ........ B01D 17/10 210/442
2009/0045128 A1 * 2/2009 Murray ................ B01D 29/114 210/340
2009/0045149 A1 * 2/2009 Murray .................. B01D 29/72 210/393
2009/0218298 A1 * 9/2009 Knox-Holmes ..... B01D 29/688 210/791
2009/0283481 A1 * 11/2009 Vandendijk ............ B01D 29/15 210/232
2011/0006008 A1 * 1/2011 Wilsak ..................... B01D 9/00 210/663
2011/0006015 A1 * 1/2011 Leonard ................. B01D 29/15 210/489
2011/0031192 A1 * 2/2011 Wiley .................... B01D 29/52 210/411
2012/0234775 A1 * 9/2012 Holopainen ........... B01D 29/66 210/791
2012/0324842 A1 * 12/2012 Schumann ............ B01D 46/08 55/303
2012/0324845 A1 * 12/2012 Doehla .................. B01D 46/02 55/378
2013/0020248 A1 * 1/2013 Mickan .................. B01D 29/52 210/345
2013/0168330 A1 * 7/2013 Strasser ................. B01D 37/02 210/791
2013/0319928 A1 * 12/2013 Zuber .................... B01D 29/66 210/440
2014/0131291 A1 * 5/2014 Schumacher ......... B01D 29/111 210/335
2014/0144830 A1 * 5/2014 Isch ..................... B01D 29/668 210/323.2
2014/0305862 A1 * 10/2014 Zur ...................... B01D 33/503 210/333.01
2015/0174515 A1 * 6/2015 Swindell ................ B01D 29/52 210/791
2016/0303515 A1 * 10/2016 Diaz Mesa ............ B01D 65/02
2017/0072344 A1 * 3/2017 Powell ................... B01D 29/66
2017/0282099 A1 * 10/2017 Park ....................... B01D 29/46

(56) References Cited

U.S. PATENT DOCUMENTS

| | | | | |
|---|---|---|---|---|
| 2018/0021704 | A1* | 1/2018 | Hensel | B01D 29/94 210/323.1 |
| 2018/0071967 | A1* | 3/2018 | Schröder | B29C 48/503 |
| 2019/0060788 | A1* | 2/2019 | Hampton | B01D 29/13 |
| 2019/0291028 | A1* | 9/2019 | Nehlen, III | B01D 29/90 |
| 2019/0329165 | A1* | 10/2019 | Backman | B01D 33/466 |
| 2019/0374882 | A1* | 12/2019 | Wetter | B01D 46/2403 |
| 2020/0086242 | A1* | 3/2020 | Mcfarlen | B01D 29/15 |
| 2020/0384387 | A1* | 12/2020 | Nehlen, III | B01D 29/52 |
| 2020/0384388 | A1* | 12/2020 | Stuiver | B01D 29/52 |
| 2021/0002145 | A1* | 1/2021 | Chen | C02F 1/001 |
| 2021/0039023 | A1* | 2/2021 | Nehlen, III | B01D 29/52 |
| 2021/0052996 | A1* | 2/2021 | Nehlen, III | B01D 29/15 |
| 2021/0086111 | A1* | 3/2021 | Nehlen, III | B01D 29/62 |
| 2021/0170311 | A1* | 6/2021 | Whitlock | B01D 29/52 |
| 2021/0221951 | A1* | 7/2021 | Termorshuizen | C08G 65/10 |
| 2021/0229006 | A1* | 7/2021 | Nehlen, III | B01D 29/52 |
| 2021/0245078 | A1* | 8/2021 | Maiworm | C11B 3/008 |
| 2021/0268409 | A1* | 9/2021 | Ruzicka | B01D 35/30 |
| 2021/0331098 | A1* | 10/2021 | Nehlen, III | B01D 24/047 |
| 2021/0346824 | A1* | 11/2021 | Curley | B01D 24/16 |
| 2021/0362083 | A1* | 11/2021 | Decker | B01D 46/0001 |
| 2021/0379521 | A1* | 12/2021 | Heidenreich | B01D 46/2407 |
| 2022/0062802 | A1* | 3/2022 | Nehlen, III | B01D 29/90 |
| 2022/0080337 | A1* | 3/2022 | Kim | B01D 29/6438 |
| 2022/0143534 | A1* | 5/2022 | Vallejo | B01D 29/902 |
| 2022/0176300 | A1* | 6/2022 | Graham | B01D 46/02 |
| 2022/0212121 | A1* | 7/2022 | Liu | B01D 29/15 |
| 2022/0233978 | A1* | 7/2022 | Stuiver | B01D 29/66 |
| 2022/0362690 | A1* | 11/2022 | Shaw | B01D 46/2407 |
| 2023/0001335 | A1* | 1/2023 | Powell | B01D 29/52 |
| 2023/0052718 | A1* | 2/2023 | Hawksley | C02F 1/004 |
| 2023/0149836 | A1* | 5/2023 | Hawksley | B01D 37/046 210/741 |
| 2023/0226470 | A1* | 7/2023 | Strasser | B01D 29/66 210/798 |
| 2023/0226479 | A1* | 7/2023 | Strasser | B01D 46/2407 55/350.1 |
| 2023/0271113 | A1* | 8/2023 | Kamath | G06F 30/17 210/268 |
| 2024/0100459 | A1* | 3/2024 | Schumacher | B01D 29/39 |
| 2024/0131456 | A1* | 4/2024 | Nehlen, III | B01D 29/52 |
| 2024/0226782 | A9* | 7/2024 | Nehlen, III | B01D 29/52 |
| 2024/0318514 | A1* | 9/2024 | John | B01D 29/66 |
| 2025/0065251 | A1* | 2/2025 | Stuiver | B01D 29/52 |
| 2025/0296855 | A1* | 9/2025 | Hawksley | C02F 1/004 |
| 2025/0375723 | A1* | 12/2025 | Nehlen, III | B01D 36/02 |
| 2026/0048346 | A1* | 2/2026 | Nehlen, III | B01D 24/10 |

FOREIGN PATENT DOCUMENTS

| | | | | |
|---|---|---|---|---|
| DE | 4025827 | A1 * | 2/1992 | B01D 29/15 |
| DE | 100 05 004 | A1 | 8/2001 | |
| EP | 0 155 336 | A1 | 9/1985 | |
| WO | 00/16875 | A2 | 3/2000 | |
| WO | WO-0156680 | A1 * | 8/2001 | B01D 29/668 |
| WO | WO-2007137646 | A1 * | 12/2007 | B01D 29/62 |
| WO | WO-2023135080 | A1 * | 7/2023 | B01D 29/68 |

* cited by examiner

CANDLE FILTER DEVICE

CROSS REFERENCE TO RELATED APPLICATIONS

This application claims the benefit under 35 U.S.C. § 119(e) of U.S. Provisional Application No. 63/299,646, filed Jan. 14, 2022, which is incorporated herein by reference in its entirety.

FIELD OF INVENTION

The invention relates to a candle filter device, primarily for filtration of solids from liquids, and containing one or more candle filter elements and the process of operating the same.

The main parts of this filter device are a pressure vessel with a head plate that separates the feed room containing the unfiltered fluid suspension from the filtrate room containing the filtered fluid and candle filter elements mounted in this head plate.

BACKGROUND OF THE INVENTION

The invention is used in the field of solid-liquid separation, more specifically in the cake filtration. Cake filtration is characterized by the fact that the particles from a suspension are deposited on the surface of a filter material, e.g., a filter cloth and form a filter cake. Generally, the filter cloth is made of a non-woven or woven fabric or of a permeable membrane, all of those for the purposes of the present invention referred to in general as filter cloth.

The support body, as the main component of a candle filter element, serves to support the filter cloth and is already known from patent DE 3249756 C2. In this prior art it is a perforated cylindrical body, which is vertically mounted inside the feed room of a pressure vessel. The filter cloth, which has the shape of a hose, is wrapped around the outside of the cylindrical body and is fastened to the same at the lower and upper end of the cylindrical body. The filter candle is closed at the bottom end and open at the top end. The open top end of the filter candle is attached to a perforated head plate separating the feed room against the room receiving the filtrate—referred to as the filtrate room—and has thereby an open connection to the filtrate room. This connection allows flow of the filtered fluid from the candle inside into the filtrate room after it has passed the filter cake and the filter cloth. During the procedure of backwash, flow is reversed and thereby filtered fluid flows from the filtrate chamber into the candle and passes the filter cloth in reversed/Inside-out—direction. The purpose of this process of reversing the flow is to remove the filter cake from the filter cloth and to remove particles from inside of pores in the porous filter cloth that would subsequently lead to blocking of the filter cloth and thereby would prevent flow over an extended period of time. Some process designs support the backwash by using pressurized gas to drive an increased amount of the filtered fluid or fluid-gas-mixture through the filter cloth.

An important design parameter of such filtration systems is the filter area that can be accommodated in a filter system. Decrease of diameter of the filter candles as well as increasing the length of the filter candle both increase the filter area that can be accommodated in a filter vessel of a given diameter and thereby decrease the cost per filter area and subsequently the cost per fluid flow to be filtered. Filter candle lengths between 1 meter and 2.5 meter and filter candle diameters between 25 mm and 120 mm are state of the art.

One of the most important performance parameters is the backwash efficiency, meaning the ability of completely removing the filter cake from the filter cloth and particles trapped inside the pores of the filter cloth. The backwash efficiency rises proportional to the fluid flow throughout the total surface of the filter candle during backwash.

In the filter candle according to the prior art, the fluid flow during backwash is limited by the ratio of length per diameter and by the pressure drop that occurs from the top of the filter candle where the filtered fluid enters the filter candle to the very bottom of the filter candle. Tests have demonstrated that with a filter candle having a diameter of 80 mm when using a typical filter cloth reasonable fluid flow to clean the filter candle with an aqueous liquid occurs only at the top 300 mm of the filter candle. The remaining length of the filter candle would not receive reasonably high filtrate flow sufficient to permanently clean the filter cloth. This leads to the need of frequent change of the filter cloth and thereby high operation cost for filter cloth and working time to change the same.

A means to improve this insufficient backwash is described in U.S. Pat. No. 4,604,201. It introduces a dip tube inside the filter candle element that is going all the way to the bottom where it is open and therefore connected to the room between dip tube and filter cloth. The top side of this dip tube is connected to a filtrate header that forms the outlet of the filtered fluid from the filter candle. During backwash, the filtered fluid inside the filtrate header is reversed by applying compressed air or other gas to the filtrate header. This air or gas drives the fluid down the dip tube and up through the free space in the candle surrounding the dip tube and inside-out through the filter cloth. At the time when the fluid level reaches the lowest point of the dip tube, a very high flowrate is achieved due to the low-pressure resistance of the gas in the dip tube. This high flowrate together with the high turbulence achieved by the compressed air or gas introduced at the bottom of the candle leads to a more successful backwash compared to the prior state of the art.

Filter apparatus according to U.S. Pat. No. 4,604,201 can accommodate large filter areas. For an effective backwash a high flowrate through each filter area segment is needed. In order to achieve this, it is required to divide the total filter area into small segments that are backwashed at a time. This leads to a technically feasible small flowrate of gas to drive the filtrate through the filter cloth as well as a technically feasible small nozzle to drain the backwashed fluid out of the vessel leading to a high pressure resistance that would limit the flow. Typically, up to 12 candle filter elements are clustered into such segments.

SUMMARY OF THE INVENTION

The problem addressed by the invention is that filter systems having filter candle elements that do not have a dip tube design are insufficiently backwashing over a major part of the filter surface and filter systems that have a dip tube are complex to implement and operate. This is solved by introducing a way to sufficiently backwash the filter candle elements that include a dip tube without dividing the filter area into increments while doing the same.

It is an object of the present invention to provide a filter device comprising a pressure vessel with a feed room and a filtrate room, separated by a head plate, wherein a) one or more filter elements are vertically mounted in the head plate, and b) a feed inlet is reaching in the feed room.

In addition, the filter device has a) at least one vent opening, and b) at least one gas supply nozzle and at least one draining nozzle, both of which are fitted to the feed room, and wherein the filter elements are equipped with dip channels inside.

Preferably the vent opening is at a higher vertical height than the lowest outlet level of the draining nozzle. The distance between the vent opening and the lowest outlet level of the draining nozzle is called "distance h".

Even more preferably the distance h between the vent opening and the lowest outlet level of the draining nozzle is designed to guarantee a buffer gas volume equivalent to the inside volume of the dip channels of all filter elements installed during backwash.

In one certainly preferred embodiment of the present invention the filter elements comprise a support body and a filter cloth that is laid around the support body, wherein the support body comprises a centrally positioned dip channel and outer longitudinal flow channels.

Preferably the support body of the filter element in the filter device according to the invention is formed of a continuous profile, even more preferably a continuous extruded profile, preferably comprising a thermoplastic material.

Preferably the outer contour of the support body of the filter element in the filter device according to the invention may be circular, star-shaped, cricket bat-shaped or elliptical.

However, for some applications an embodiment may be suitable wherein a central tube forms the dip channel and longitudinal bars are mounted on that central tube.

In a preferred embodiment of the invention the outer longitudinal flow channels of the filter elements are formed by longitudinal walls within the material of the support body with rounded outer edges and are covered by the filter cloth.

Preferably the dip channel volume of a filter element is, at least equal to or greater than, 1% larger than the total differential volume of all outer longitudinal flow channels of the same filter element, preferably between 1% and 5% larger.

In a preferred embodiment of the invention the filter cloth is fixed on the filter element by cloth-fixing elements, in particular by one cloth-fixing element at the bottom end of the longitudinal channel area and one cloth-fixing element at the top end of the longitudinal channel area of the candle filter element. In this embodiment of the present invention the cloth-fixing elements are also sealing the filtrate room against the feed room.

Preferably the filter element is further equipped with a coupling part between the support body and the fixing device and with a pin for an optimum alignment of the filter element in the filter device.

Preferably the filter cloth is fixed above the coupling part of the filter element to cover the pin and the bottom part of the coupling part.

The thermoplastic material of the filter element according to the invention may be a compound material containing stability-enhancing additives such as carbon fibers or glass fibers.

Another object of the present invention is to provide a process for backwashing a filter device as described above, comprising the following steps:

a) Depressurizing the filter device, b) Draining all possible suspension from the feed room by the draining nozzle, c) Pressurizing the filter device by a pressurized gas through the gas supply nozzle d) Backwashing the filter elements by i) Rapidly relieving the pressure in the feed room, thereby inducing a gas impulse of the compressed gas from the filtrate room that rapidly and intensively drives the filtrate downwards inside the dip channels, ii) Allowing the filter cloth to expand until it reaches its maximum cross-section, thereby removing the filter cake from the filter cloth, e) Optionally allowing the sedimentation of filter cake slurry, and f) Draining the filter cake slurry from bottom part of the feed room by the emptying nozzle.

DETAILED DESCRIPTION

It is an object of the present invention to provide a filter device comprising a pressure vessel with a feed room and a filtrate room, separated by a head plate, wherein a) one or more filter elements are vertically mounted in the head plate, and b) a feed inlet is reaching in the feed room.

In addition, the filter device has a) at least one vent opening, and b) at least one gas supply nozzle and at least one draining nozzle, both of which are fitted to the feed room, and wherein the filter elements are equipped with dip channels inside.

Figure 2:
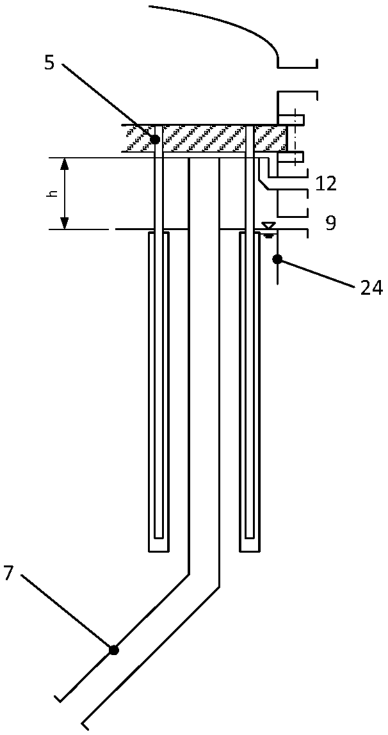
FIG. 2 shows a detail of the filter apparatus according to the invention.

The feed inlet may consist in a standpipe with a standpipe outlet according to FIG. 2. Alternatively, the feed inlet may be one or more nozzles that are mounted in the side wall of the feed room. The vent opening should be mounted in the feed room at the highest technically possible position. The vent opening may be a) identical with the feed inlet, e.g., a standpipe outlet (Alternative A); b) may be separate nozzles in the side wall of the feed room (Alterative B); or c) may be a nozzle in the head plate, connected to the outside of the filter device (not to the filtrate room) (Alterative C). Alternative A with a standpipe and a standpipe outlet is shown in FIG. 2.

Preferably the vent opening is at a greater vertical height than the lowest outlet level of the draining nozzle. The distance between the vent opening and the lowest outlet level of the draining nozzle is called "distance h".

Even more preferably the distance h between the vent opening and the lowest outlet level of the draining nozzle is designed to guarantee a buffer gas volume equivalent to the inside volume of the dip channels of all filter elements installed during backwash.

The filter elements installed in the filter device may be of various types generally already known in the prior art. The filter elements can be of the types, e.g., disclosed in DE 3249756 C2, U.S. Pat. No. 4,473,472 or U.S. Pat. No. 4,968,424, each of which is incorporated herein by reference. However, in one certainly preferred embodiment of the present invention the filter elements comprise a support body and a filter cloth that is laid around the support body, wherein the support body comprises a centrally positioned dip channel and outer longitudinal flow channels. The filter cloth may be wrapped around the support body. During operation of the filter element the filter cloth supports a filter cake when flowed through by a suspension from the outside to the inside. The dip channel may have a circular or a non-circular, e.g., square, hexagonal etc. cross-section. "Channels" in the context of the present invention shall mean longitudinal free spaces that are formed by the material of the support body, but shall explicitly exclude tubes like, e.g., in U.S. Pat. No. 4,473,472. The simplest embodiment of the dip channel may be a longitudinal free space of circular cross-section in the center of the profile. The outer longitudinal flow channels are essentially completely open radially towards the outside of the filter element—and not only perforated to a certain extent like in U.S. Pat. No. 4,473,472—, as can be seen in FIGS. 3, 4, 5, 6, 7 and 8. This feature of the flow channels provides for a lower resistance against the liquid flow or respective gas flow during filtration operation and backwashing and thereby results in a more efficient backwashing.

Preferably the support body of the filter element in the filter device according to the invention is formed of a continuous profile, even more preferably a continuous extruded profile, preferably comprising a thermoplastic material. Instead, the extruded profile may be made of another extruded material, e.g., a metal (like aluminum, etc.) or glass. In principle, even a ceramic material may be suitable.

"Continuous" in the context of the present invention means that the cross-section of the body is identical over the whole length of the support body. "Extruded" in the context of the present invention means that the support body over its whole length as well as all longitudinal bars are continuously formed in an extrusion process.

Continuous, extruded profiles generally have the advantage that they usually show no dead zones like edges, corners and the like, where filter fluid or particles could stay for long residence time and undergo changes like decomposition, ageing, bacterial growth etc. that could have negative effects.

However, for some applications where dead zones are less dangerous, also continuous profiles comprising a central tube that forms the dip channel and longitudinal bars mounted on that central tube by known methods (like welding, screwing, riveting, etc.) are suitable. Such bodies could for example be longitudinal finned tubes, like, e.g., used for liquid-air heat exchangers.

Preferably the outer contour of the support body of the filter element in the filter device according to the invention may be circular, star-shaped, cricket bat-shaped or elliptical. "Elliptical" shall mean a rounded, non-edged, non-circular outer contour with two axes of symmetry showing a relation of the long and short axes of symmetry of the cross-section of the support body of between 1,1:1 and 20:1. A cricket bat shape will also be possible for the purposes of the present invention. Some suitable outer contour forms, i.e., profile shapes, can be derived from FIGS. 5 (round), 6 (star-shaped) and 7 (cricket bat-shaped).

In a preferred embodiment of the invention the outer longitudinal flow channels of the filter elements are formed by longitudinal walls within the material of the support body with rounded outer edges and are covered by the filter cloth. During the filtration operation the filter cloth lays on these rounded outer edges and therefore is essentially supported by the longitudinal walls.

Preferably the dip channel volume of a filter element is, at least equal to or greater than, 1% larger than the total differential volume of all outer longitudinal flow channels of the same filter element, preferably between 1% and 5% larger. The total differential volume shall mean the total volume (accessible for the filtrate) in the filter cloth in backwashing position minus the volume (accessible for the filtrate) of the channels covered by the filter cloth in the filtration position.

In a preferred embodiment of the invention the filter cloth is a substantially cylindrical filter cloth. Preferably it is fixed on the filter element by cloth-fixing elements, in particular by one cloth-fixing element at the bottom end of the longitudinal channel area and one cloth-fixing element at the top end of the longitudinal channel area of the candle filter element. In this embodiment of the present invention the cloth-fixing elements are also sealing the filtrate room against the feed room. Cloth-fixing elements may be, e.g., clamps, tension rings or other suitable devices that are principally known to the skilled in the art.

Preferably the filter element is further equipped with a coupling part between the support body and the fixing device and with a pin for an optimum alignment of the filter element in the filter device.

Figure 3:
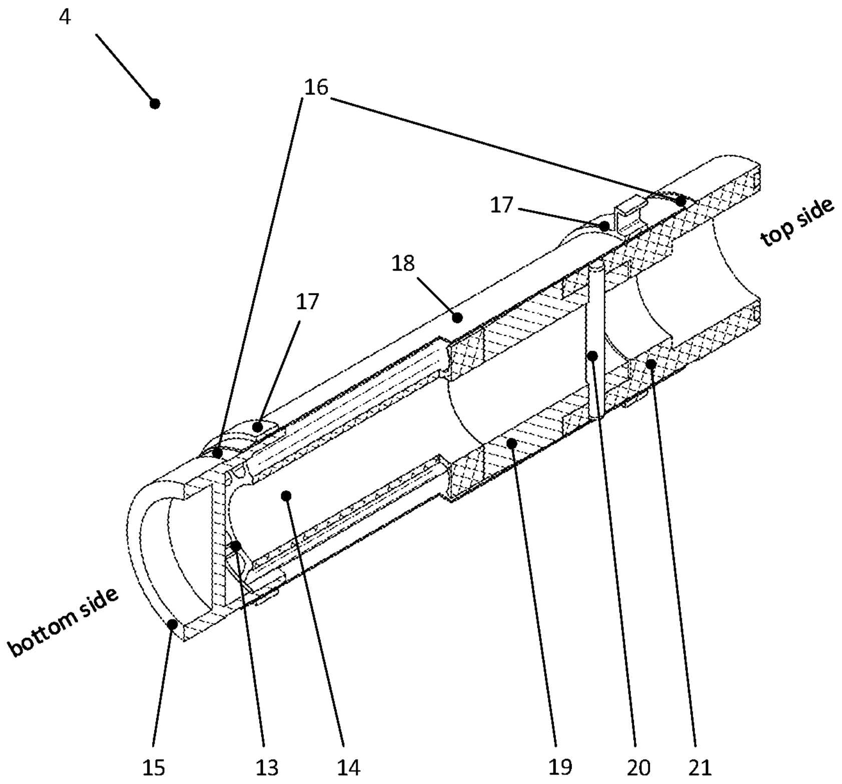
FIG. 3 shows a longitudinal section of a candle filter element according to the invention.
Figure 4:
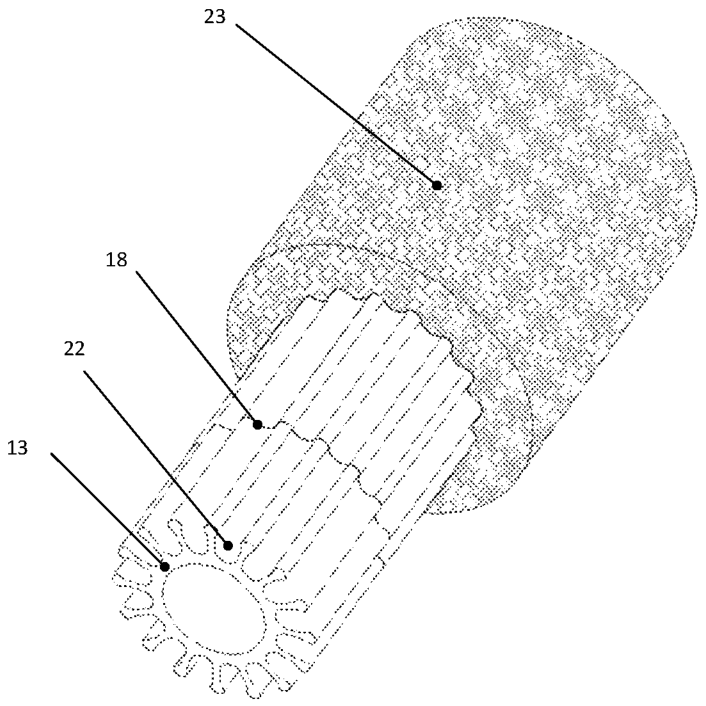
FIG. 4 shows a detail of the extruded support body with a filter cloth and a filter cake comprising of the particles filtered from the feed suspension.

Preferably the filter cloth is fixed above the coupling part to cover the pin and the bottom part of the coupling part, as can be seen in FIG. 3.

The thermoplastic material of the filter element according to the invention may be a compound material containing stability-enhancing additives such as carbon fibers or glass fibers. Such materials as well as the methods to shape them in an appropriate way are in principle known by the skilled in the art.

Another object of the present invention is to provide a process for backwashing a filter device as described above, comprising the following steps:

a) Depressurizing the filter device,
b) Draining all possible suspension from the feed room by the draining nozzle in order to guarantee a buffer gas volume equivalent to the inside volume of the dip channels of all filter elements installed,
c) Pressurizing the filter device by a pressurized gas through the gas supply nozzle
d) Backwashing the filter elements by
   i) Rapidly relieving the pressure in the feed room by quickly opening the vent opening(s), thereby inducing a gas impulse of the compressed gas from the filtrate room that rapidly and intensively drives the filtrate downwards inside the dip channels,
   ii) Allowing the filter cloth to expand until it reaches its maximum cross-section, thereby removing the filter cake from the filter cloth, e) Optionally allowing the sedimentation of filter cake slurry, and f) Draining the filter cake slurry from bottom part of the feed room by the emptying nozzle.

If the filter cake slurry has sedimented, then only a part of the content of the feed room can be drained. Alternatively, if the filter cake slurry has not sedimented, then the whole content of the feed room can be drained.

Figure 1:
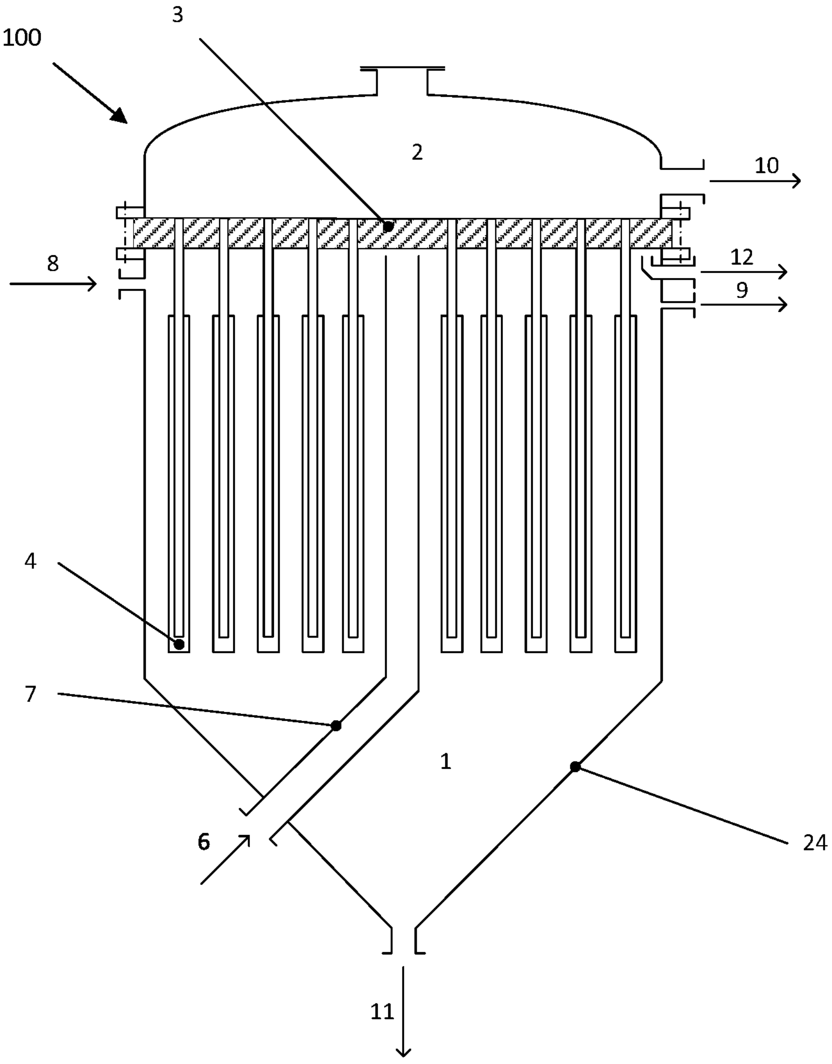
FIG. 1 shows a filter apparatus according to the invention.

FIG. 1 shows a filter vessel 100 with a number of the filter candles 4, according to the invention that are mounted on a head plate 3 which separates the feed room 1 from the filtrate room 2.

The filter candles 4 are connected to the filtrate room through holes 5 in the head plate, shown in FIG. 2.

The filter vessel 100 further is equipped with a feed inlet nozzle 6 extending through a lower wall portion 24 of the filter vessel and connected to a standpipe 7, a gas supply nozzle 8, a draining nozzle 9, a filtrate nozzle 10 and an emptying nozzle 11 and a further outlet 12.

Filtration happens by introducing unfiltered fluid containing particles, together forming a suspension, into the feed room 1 via feed nozzle 6. The particles remain on the outside surface of the filter candles 4 and filtered fluid flows through the filter candles 4 into the filtrate room 2 and further leaves the filter vessel via filtrate nozzle 10.

To discharge the solids, typically in form of a slurry, the feed room 1 remains filled after finishing a filtration cycle, indicated by a defined thickness of the filter cake or by reaching a predetermined differential pressure and is depressurized via outlet 12. Draining nozzle 9 will be opened and the apparatus will be drained. The level of fluid in the filter candles 4 will automatically reach the same height as the level in the feed room 1 and will be equal to the lowest outlet level of draining nozzle 9. The filter candles 4 at this step are filled with filtrate inside whereas the feed room 1 is filled with unfiltered fluid. The volume in the feed room 1 defined by the lowest outlet level of draining nozzle 9 and (according to Alternative A) the outlet 12 is required to receive the filtrate volume from the filter candles 4 after backwash, which determines the distance h between the lowest outlet level of nozzle 9 and the outlet 12 (see FIG. 2). By designing this volume big enough to receive the full volume of backwash fluid, it is ensured that nowhere in the system there is a high resistance to flow of the backwash fluid even when backwashing the total filter area at once.

In a next step pressurized gas is applied via gas supply nozzle 8. The vessel 100 will be pressurized inside the feed room 1 first and then via the filter candles 4 inside the filtrate room 2. This means that finally all chambers of the vessel 100 are operated at substantially the same gas pressure. In a next step a valve at outlet 12 is opened as rapidly as technically possible, preferably in less than 1 second, the pressure in the feed room 1 is thereby decreasing rapidly and a gas impulse is applied with the help of the compressed gas in the filtrate room 2 that rapidly and intensively drives the filtrate downwards inside the dip tubes. Furthermore, it drives the filtrate between the dip tubes and the filter cloth upwards along the outer flow channel(s) of the support structure in the reverse flow direction inside out through the filter cloth.

This happens at the whole filter area within a very short time period (<1 second), ensured by the high volume of pressurized gas provided in filtrate room 2 and the sufficient gas volume inside the feed room 1 to accept the total fluid backwashed.

As a result, the filter cloth expands until it reaches a full circular cross-section, which is larger than the respective diameter cross-section of the support body (including the longitudinal bars). As the filtrate flows through the filter cloth from the inside to the outside, which is the opposite direction to the flow of filtration it removes the filter cake from the filter cloth. At the same time, it also removes particles entrapped inside the pores of the filter cloth.

The filter cake is resuspended in the unfiltered fluid room and after sedimentation, it accumulates at the bottom part of the filter vessel 100 as a slurry from where it is discharged via an emptying nozzle 11.

FIG. 3 shows the main parts of the candle filter 4. The support body 13 includes an extrusion profile with integrated dip tube 14, a bottom part 15 for collecting the filtrate and redirecting the flow and a support area 16 for the clamp 17 to fasten the filter cloth 18, a coupling part 19 to connect the filter element via a pin 20 with the fixing device 21. On the fixing device 21, there is another support area 16 for the clamp 17 to fasten the filter cloth. One clamp shall be on the bottom side and one clamp shall be on the top side of the filter cloth. On the top side, the filter element 4 is equipped with a means (not shown) to connect the same to the filtrate room 2.

According to the invention, unfiltered fluid passes the candle filter element from outside in. The fluid passes the filter cloth and a certain differential pressure is built from the outside to the inside. Driven by this differential pressure, the filter cloth 18 will lay down on the surface of the support body 13 (see FIG. 4). This happens very evenly around the circumference. The particles of the unfiltered fluid separated on the surface of the filter cloth 18, build particle bridges and a filter cake 23 is thereby formed. The clean filtered fluid passes the filter cloth 18 and is collected in the outer longitudinal flow channels 22 of the support body 13. These channels 22 are closed on the top side of the support body, so the filtered fluid is forced to flow downwards, to the bottom part 15, is redirected there to flow upwards through the dip tube 14 of the support body 13 and to exit the candle filter element 4 at the top side. After finishing building up a filter cake 23, the filter candle 4 will be cleaned where after filtration starts again. Cleaning can be done in two different ways. Depending whether the filter cake 23 is desired to be discharged in a dry manner or whether a filter cake discharge as a slurry is desired for the process Backwash and cake discharge happens by reversing the flow of fluid by means of a pump or of introducing a gas from filtrate side. Cake discharge can be done in a dry manner, by firstly removing all the liquid from the system and dropping the filter cake through a bottom valve, or, in a slurry form by backwashing into the filled feed room 1 and afterward draining the slurry from the same.

Figure 5:
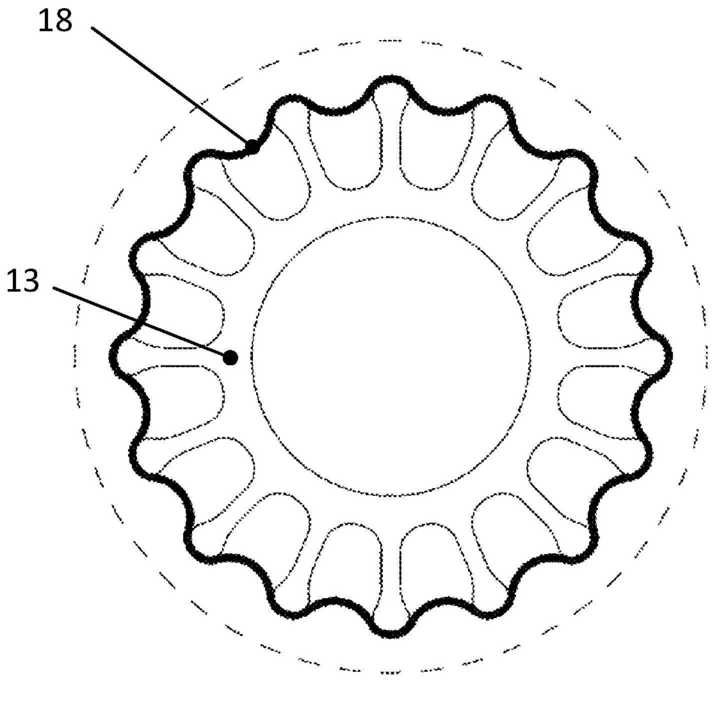
FIG. 5 shows a preferred design of a filter candle element for wet cake discharge according to the invention.

FIG. 5 shows a preferred design of a filter candle element 4 for wet cake discharge according to the invention. The support body 13 for the filter cake including the outer flow channels for the filtrate and the dip channel are all made of one continuously extruded profile. Thus, the element only needs to be completed by top and bottom parts, preferably made of simple machined or injection molded parts and therefore the material used as well as the time needed to fabricate the element is kept at a minimum. The diameter of the dip tube channel is thereby designed to accommodate enough fluid to compensate for the volume change caused by the movement of the filter cloth during backwash.

Figure 6:
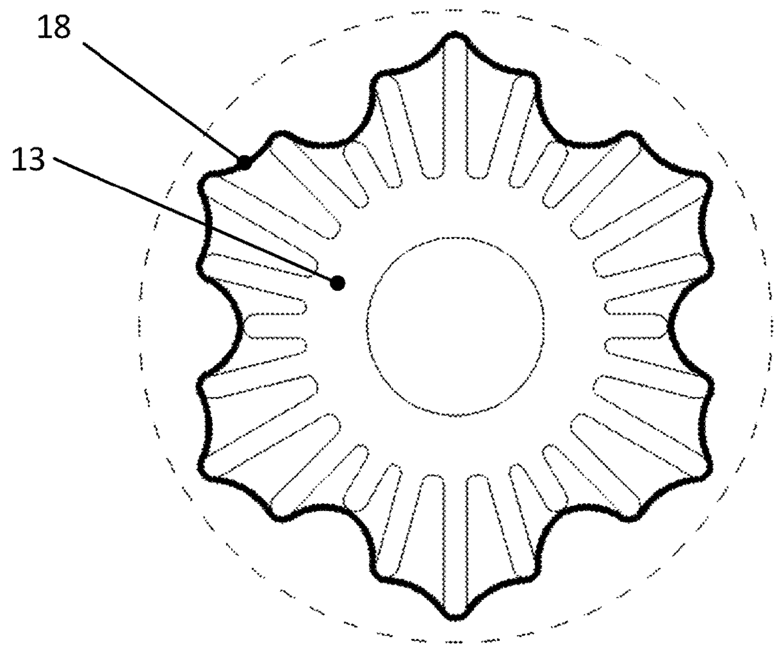
FIG. 6 shows the cross section of an alternative embodiment where the continuously extruded profile resembles a star shape.

FIG. 6 shows the cross section of an alternative embodiment where the continuously extruded profile resembles a star shape and thereby allows for a higher movement of the filter cloth 18 when being inflated during the application of compressed gas from the inside thus having an improved filter cake release.

Figure 7:
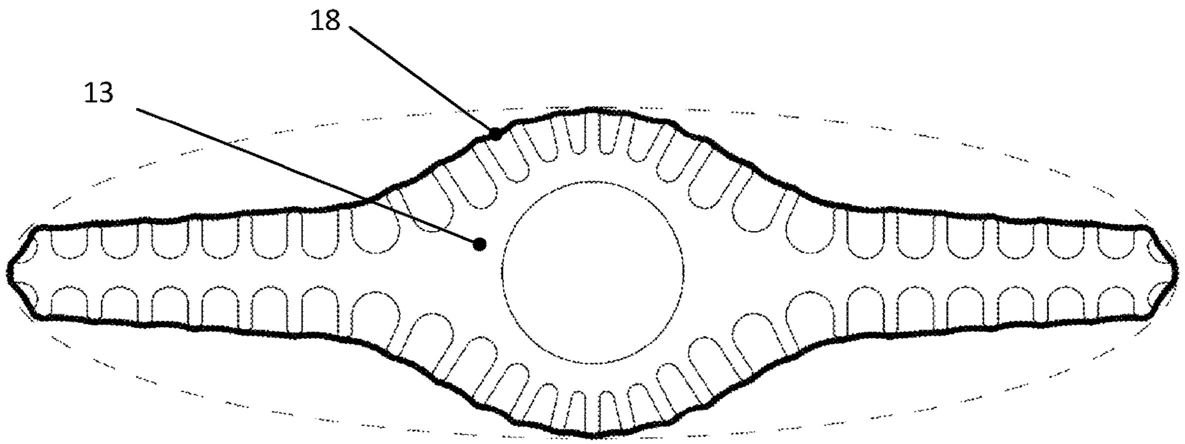
FIG. 7 shows the cross section of an alternative embodiment where the continuously extruded profile resembles a cricket bat.

FIG. 7 shows the cross section of an alternative embodiment where the continuously extruded profile 13 resembles a cricket bat that again allows for a high movement of the filter cloth when being inflated during the application of compressed gas from the inside. This embodiment has an additional advantage of allowing form accommodating a higher total volume of filter cake in a given filter vessel dimension.

Figure 8:
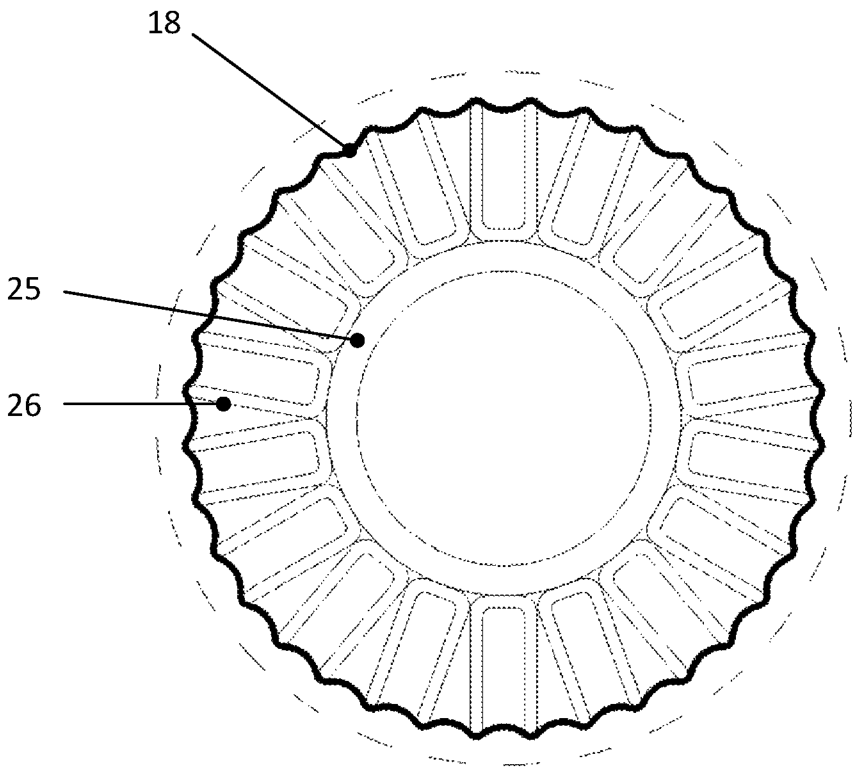
FIG. 8 shows the cross section of an alternative embodiment of a filter candle where the longitudinal bars are mounted on the main body.

FIG. 8 shows the cross section of an alternative embodiment where the longitudinal bars are mounted on the main body by welding (e.g., resistance welding) U-shaped metal profiles 26 onto a central tube 25.

The invention claimed is:

1. A filter assembly comprising:
- a filter vessel (100) defining a hollow interior;
- a head plate (3) having a plurality of holes (5) extending therethrough, the head plate sealingly dividing the hollow interior into:
  - a feed room (1) for receiving an unfiltered fluid to be filtered; and
  - a filtrate room (2) for receiving filtered fluid, being in fluid communication with at least one filtrate outlet (10) capable of permitting filtered fluid to exit the filtrate room (2);
- a plurality of filter candles (4) mounted to the head plate (3), each filter candle (4) including a filter material surrounding a centrally disposed dip tube (14) defining an interior volume or dip channel therein, the interior volume being in fluid communication with a respective hole (5) for delivering fluid passing through the filter material to the filtrate room (2);
- a gas supply inlet (8) extending through a wall of the filter vessel (100) and in fluid communication with the feed room (1) for introducing a gas into the feed room (1);
- a depressurization outlet (12) extending through the wall of the filter vessel (100) and in fluid communication with the feed room (1), for depressurizing the feed room (1);
- a discharge outlet (11) in fluid communication with the feed room (1) and disposed at a lowermost portion of the filter vessel (100), for emptying the feed room (1);
- a feed inlet (6) extending through a lower wall portion (24) of the filter vessel (100); and
- a standpipe (7) in fluid communication with the feed inlet (6) within the feed room (1), for receiving a fluid to be filtered from the feed inlet (6) and introducing the received fluid into the feed room (1), the standpipe (7) extending vertically into a region within the feed room (1) between at least some of the plurality of filter candles (4), for introducing fluid to be filtered through an opening at the end of the standpipe (7), into the region.

2. The filter assembly of claim 1, wherein each of the plurality of filter candles comprises a support body (13) disposed about the dip tube (14) for supporting the filter material, the filter material being laid around the support body.

3. The filter assembly of claim 2, wherein the support body comprises outer longitudinal flow channels (22).

4. The filter assembly of claim 3, wherein the outer longitudinal flow channels (22) of the plurality of filter candles (4) are formed by longitudinal walls with rounded outer edges and are covered by the filter material.

5. The filter assembly of claim 2, wherein the support body (13) is formed of a continuous extruded profile.

6. The filter assembly of claim 2, wherein the support body (13) comprises a thermoplastic material.

7. The filter assembly of claim 6, wherein the thermoplastic material includes carbon fibers or glass fibers.

8. The filter assembly of claim 2, wherein the cross-sectional shape of the support body of each of the plurality of filter candles is circular.

9. The filter assembly of claim 2, wherein the cross-sectional shape of the support body of each of the plurality of filter candles is star-shaped.

10. The filter assembly of claim 2, wherein the cross-sectional shape of the support body of each of the plurality of filter candles is cricket bat-shaped.

11. The filter assembly of claim 2, wherein the cross-sectional shape of the support body of each of the plurality of filter candles is elliptical.

12. The filter assembly of claim 2, wherein the filter material is a filter cloth that is fixed on each of the plurality of filter candles (4) by cloth-fixing elements, with one cloth-fixing element disposed at an upper support area (16) of the support body (13) and one cloth-fixing element disposed at a lower support area (16) of the support body (13) of the plurality of candle filter elements (4).

13. The filter assembly of claim 12, wherein the cloth-fixing elements are clamps or tension rings (17).

14. The filter assembly of claim 2, wherein each of the plurality of filter candles (4) further comprises a coupling part (19) disposed between the support body (13) and a fixing device (21) with a pin (20).

15. The filter assembly of claim 14, wherein the filter cloth is fixed above the coupling part (19) of each filter candle to cover the pin (20) and the coupling part (19).

16. The filter assembly of claim 1, wherein longitudinal bars are mounted on an exterior surface of the dip tube (14).

17. The filter assembly of claim 1, wherein a dip channel volume of each filter candle is, at least equal to or greater than, 1% larger than the total differential volume of all outer longitudinal flow channels of the same filter candle.

18. The filter assembly of claim 1, wherein a dip channel volume of each filter candle ranges from at least 1% to at most 5% of the total differential volume of all outer longitudinal flow channels of the same filter candle.

19. The filter assembly of claim 1, wherein the filter material is a cloth.

* * * * *